(12) United States Patent
Ahmed et al.

(10) Patent No.: US 8,713,286 B2
(45) Date of Patent: Apr. 29, 2014

(54) REGISTER FILES FOR A DIGITAL SIGNAL PROCESSOR OPERATING IN AN INTERLEAVED MULTI-THREADED ENVIRONMENT

(75) Inventors: Muhammad Ahmed, Austin, TX (US);
Erich Plondke, Austin, TX (US);
Lucian Codrescu, Austin, TX (US);
William C. Anderson, Austin, TX (US)

(73) Assignee: QUALCOMM Incorporated, San Diego, CA (US)

( * ) Notice: Subject to any disclaimer, the term of this patent is extended or adjusted under 35 U.S.C. 154(b) by 1524 days.

(21) Appl. No.: 11/115,916

(22) Filed: Apr. 26, 2005

(65) Prior Publication Data

US 2006/0242384 A1 Oct. 26, 2006

(51) Int. Cl.
*G06F 7/57* (2006.01)

(52) U.S. Cl.
USPC ............................... 712/24; 712/22

(58) Field of Classification Search
USPC ............... 712/24, 240, 241, 200, 1, 217, 218, 712/204, 23, 35, 11, 214, 226; 711/149, 711/123, 125; 713/300; 708/603
See application file for complete search history.

(56) References Cited

U.S. PATENT DOCUMENTS

| 5,574,939 | A | * | 11/1996 | Keckler et al. .................. 712/24 |
| 5,764,943 | A | * | 6/1998 | Wechsler ...................... 712/218 |
| 6,002,880 | A | | 12/1999 | Slavenburg |
| 6,014,739 | A | | 1/2000 | Christie |
| 6,023,756 | A | * | 2/2000 | Okamura ....................... 712/208 |
| 6,044,451 | A | | 3/2000 | Slavenburg et al. |
| 6,055,628 | A | * | 4/2000 | Seshan et al. .................. 712/235 |
| 6,092,175 | A | * | 7/2000 | Levy et al. ....................... 712/23 |
| 6,161,166 | A | * | 12/2000 | Doing et al. ................... 711/125 |
| 6,282,505 | B1 | * | 8/2001 | Hanawa et al. .................. 703/25 |
| 6,314,511 | B2 | * | 11/2001 | Levy et al. ..................... 712/217 |
| 6,320,813 | B1 | | 11/2001 | Kant |
| 6,385,757 | B1 | | 5/2002 | Gupta et al. |

(Continued)

FOREIGN PATENT DOCUMENTS

| EP | 0605927 | 7/1994 |
| EP | 0745933 | 4/1996 |
| TW | 539989 B | 7/2003 |
| TW | 200504596 | 2/2005 |

OTHER PUBLICATIONS

Labrousse et al. CREATE-LIFE: A Modular Design Approach for High Performance ASIC's, IEEE, 1990, pp. 427-433.*

(Continued)

*Primary Examiner* — Cheng-Yuan Tseng
(74) *Attorney, Agent, or Firm* — Peter Michael Kamarchik; Nicholas J. Pauley; Joseph Agusta

(57) ABSTRACT

A processor device is disclosed and includes a memory and a sequencer that is responsive to the memory. The sequencer supports very long instruction word (VLIW) type instructions and at least one VLIW instruction packet uses a number of operands during execution. The processor device further includes a plurality of instruction execution units responsive to the sequencer and a plurality of register files. Each of the plurality of register files includes a plurality of registers and the plurality of register files are coupled to the plurality of instruction execution units. Further, each of the plurality of register files includes a number of data read ports and the number of data read ports of each of the plurality of register files is less than the number of operands used by the at least one VLIW instruction packet.

28 Claims, 8 Drawing Sheets

(56) References Cited

U.S. PATENT DOCUMENTS

| | | | |
|---|---|---|---|
| 6,397,324 | B1 | 5/2002 | Barry et al. |
| 6,457,173 | B1 | 9/2002 | Gupta et al. |
| 6,523,055 | B1 * | 2/2003 | Yu et al. ............ 708/603 |
| 6,606,700 | B1 * | 8/2003 | Sih et al. ............ 712/35 |
| 6,724,416 | B1 | 4/2004 | Liu |
| 6,904,511 | B2 * | 6/2005 | Hokenek et al. .......... 712/26 |
| 7,127,588 | B2 * | 10/2006 | Mohamed et al. .......... 712/24 |
| 7,590,824 | B2 * | 9/2009 | Ahmed et al. .......... 712/214 |
| 2001/0042188 | A1 * | 11/2001 | Tremblay et al. ............ 712/11 |
| 2002/0089348 | A1 * | 7/2002 | Langhammer .......... 326/38 |
| 2003/0033509 | A1 | 2/2003 | Leibholz et al. |
| 2003/0073412 | A1 * | 4/2003 | Meade, II .......... 455/70 |
| 2004/0015931 | A1 * | 1/2004 | Larin et al. .......... 717/158 |
| 2004/0093484 | A1 | 5/2004 | Barry et al. |
| 2004/0260912 | A1 * | 12/2004 | Linnermark .......... 712/218 |
| 2004/0266480 | A1 * | 12/2004 | Hjelt et al. .......... 455/558 |
| 2006/0129848 | A1 * | 6/2006 | Paksoy et al. .......... 713/193 |

OTHER PUBLICATIONS

Intel, IA-32 Intel Architecture Software Developer's Manual, 2004, Pages. vol. 1, 2-11, 2-13, vol. 2B, B-21.*

Colwell et al., A VLIW Architecture for a Trace Scheduling Compiler, Aug. 1998, IEEE Transactions on Computers, vol. 37, pp. 967-979.*

Weste et al, Principles of COMS VLSI Design, 1993, Addison Wesley, pp. 580-582.*

Johan Janssen and Henk Corporaal; Partitioned Register File for TTAs; IEEE, Proceedings of MICRO-28; 1995; pp. 303-311; 1072-4451/95.

International Search Report and Written Opinion—PCT/US2006/015391, International Search Authority—European Patent Office—Aug. 6, 2007.

Jones K, A., et al., "An FPGA-based VLIW Processor with Custom Hardware Execution", Proceedings of the 2005 ACM/SIGDA 13th internationai symposium on Field programmable gate arrays, pp. 107-117, Feb. 20-22, 2005.

Taiwan Search Report—TW095114819—TIPO—Nov. 23, 2012.

Tseng H, J., et al., "Banked multiported register files for high-frequency superscalar microprocessors", Proceedings of the 30th annual international symposium on Computer architecture, pp. 62-71, 2003.

Zhang Y., et al., "A New Register File Access Architecture for Software Pipelining in VLIW Processors", Proceedings of the 2005 Asia and South Pacific Design Automation Conference, Jan. 18-21, 2005, vol. 1, pp. 627-630, 2005.

* cited by examiner

REGISTER FILES FOR A DIGITAL SIGNAL PROCESSOR OPERATING IN AN INTERLEAVED MULTI-THREADED ENVIRONMENT

BACKGROUND

I. Field

The present disclosure generally relates to digital signal processors. More particularly, the disclosure relates to digital signal processor register files.

II. Description of Related Art

Advances in technology have resulted in smaller and more powerful personal computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and IP telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can include a web interface that can be used to access the Internet. As such, these wireless telephones include significant computing capabilities.

Typically, as these devices become smaller and more powerful, they become increasingly resource constrained. For example, the screen size, the amount of available memory and file system space, and the amount of input and output capabilities may be limited by the small size of the device. Further, the battery size, the amount of power provided by the battery, and the life of the battery is also limited. One way to increase the battery life of the device is to reduce the amount of time that a digital signal processor within the device is idle while the device is powered on.

Accordingly it would be advantageous to provide an improved digital signal processor for use in portable communication devices.

SUMMARY

A processor device is disclosed and includes a memory and a sequencer that is responsive to the memory. The sequencer supports very long instruction word (VLIW) type instructions and at least one VLIW instruction packet uses a number of operands during execution. The processor device further includes a plurality of instruction execution units responsive to the sequencer and a plurality of register files. Each of the plurality of register files includes a plurality of registers and the plurality of register files are coupled to the plurality of instruction execution units. Further, each of the plurality of register files includes a number of data read ports and the number of data read ports of each of the plurality of register files is less than the number of operands used by the at least one VLIW instruction packet.

In a particular embodiment, the sequencer further supports superscalar type instructions and at least one superscalar instruction uses a number of operands during execution. In another particular embodiment, the number of data read ports of each of the plurality of register files is less than a number of operands used by the at least one superscalar instruction. In still another particular embodiment, the number of operands used during the execution of the at least one VLIW instruction or the at least one superscalar instruction is six and the number of data read ports is four. In yet still another particular embodiment, each of the plurality of register files includes less than three data write ports. In yet another particular embodiment, each of the plurality of register files includes three data write ports.

In a particular embodiment, the plurality of register files includes six register files. Further, in another particular embodiment, the memory includes six instruction caches and each instruction cache is associated with one of the six register files. Moreover, in a particular embodiment, the memory includes six instruction queues. Each instruction queue is associated with a single instruction cache within the memory and each instruction queue is coupled to the sequencer.

In another embodiment, a method of operating a digital signal processor is disclosed and includes accessing a register file via a first data read port during a decode clock cycle. Further, the method includes maintaining access to the register file via the first data read port as the clock changes to a register file access clock cycle and retrieving a first operand from the register file during the register file access clock cycle via the first data read port. Additionally, the method disclosed herein includes accessing the register file via the first data read port during the register file access clock cycle.

In another embodiment, a method of updating a register file within a digital signal processor is disclosed and includes updating the register file a first time via a first data write port during an instruction execution clock cycle and updating the register file a second time via the first data write port during a write back clock cycle.

In yet another embodiment, a multithreaded processor device is disclosed and includes a memory, a sequencer responsive to the memory, a plurality of instruction execution units responsive to the sequencer, and a first register file that includes a first plurality of registers. The first register file is coupled to each of the plurality of instruction execution units and the first register file supports execution of a first program thread to be executed. Further, the first register file includes no more than four data read ports. The multithreaded processor device also includes a second register file that includes a second plurality of registers. The second register file is coupled to each of the plurality of instruction execution units and the second register file supports execution of a second program thread to be executed. Additionally, the second register file includes no more than four data read ports.

In still another embodiment, a portable communication device is disclosed and includes a digital signal processor. The digital signal processor includes a memory, a sequencer that is responsive to the memory to fetch a program instruction having a number of operands, at least one instruction execution unit that is responsive to the sequencer, and a plurality of register files that are coupled to the at least one instruction execution unit. Each of the plurality of register files includes no more than four data read ports and the number of operands is greater than four.

In yet still another embodiment, an audio file player is disclosed and includes a digital signal processor, an audio coder/decoder (CODEC) that is coupled to the digital signal processor, a multimedia card that is coupled to the digital signal processor, and a universal serial bus (USB) port that is coupled to the digital signal processor. The digital signal processor include a memory, a sequencer that is responsive to the memory to fetch a program instruction having a number of operands, at least one instruction execution unit that is responsive to the sequencer, and a plurality of register files that are coupled to the at least one instruction execution unit.

Each of the plurality of register files includes no more than four data read ports and the number of operands is greater than four.

In still yet another embodiment, a processor device is disclosed and includes means for accessing a register file via a first data read port during a decode clock cycle, means for maintaining access to the register file via the first data read port as the clock changes to a register file access clock cycle, and means for retrieving a first operand from the register file during the register file access clock cycle via the first data read port. Further, the processor device includes means for accessing the register file via the first data read port during the register file access clock cycle, means for maintaining access to the register file via the first data read port as the clock changes to a first instruction execution clock cycle, and means for retrieving a second operand from the register file during the first instruction execution clock cycle via the first data read port.

In another embodiment, a processor device is disclosed and includes means for updating a register file a first time via a first data write port during an instruction execution clock cycle and means for updating the register file a second time via the first data write port during a write back clock cycle.

An advantage of one or more embodiments disclosed herein can include accessing a number of operands greater than a number of data read ports in a register file.

Another advantage can include providing access to a number of operands equal to the number of data read ports during one clock cycle and providing access to more operands up to the number of data read ports during a subsequent clock cycle via the same data read ports.

Yet another advantage can include substantially reducing size of memory within a digital signal processor.

Yet still another advantage can include substantially reducing one or more costs associated with manufacturing a digital signal processor.

Still yet another advantage can include substantially reducing power consumption of a power source coupled to a digital signal processor.

Other aspects, advantages, and features of the present disclosure will become apparent after review of the entire application, including the following sections: Brief Description of the Drawings, Detailed Description, and the Claims.

BRIEF DESCRIPTION OF THE DRAWINGS

The aspects and the attendant advantages of the embodiments described herein will become more readily apparent by reference to the following detailed description when taken in conjunction with the accompanying drawings wherein.

DETAILED DESCRIPTION

Figure 1:
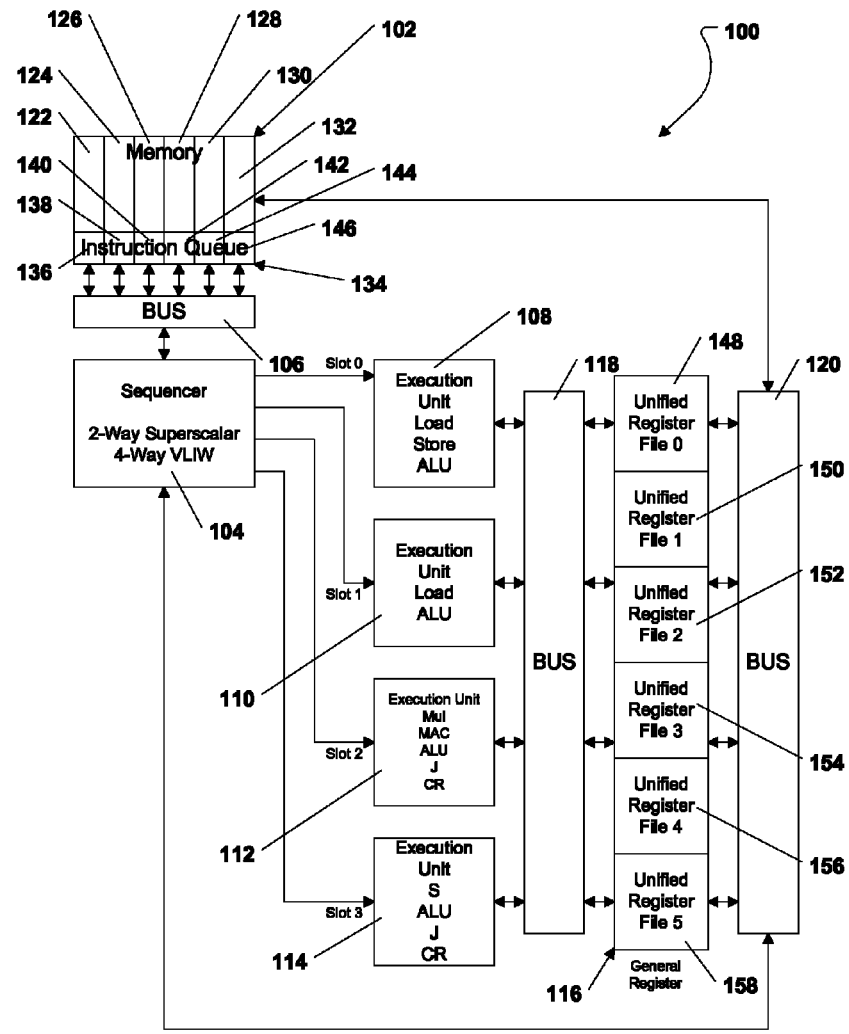
FIG. 1 is a general diagram of an exemplary digital signal processor.

FIG. 1 illustrates a block diagram of an exemplary, non-limiting embodiment of a digital signal processor (DSP) 100. As illustrated in FIG. 1, the DSP 100 includes a memory 102 that is coupled to a sequencer 104 via a bus 106. In a particular embodiment, the bus 106 is a sixty-four (64) bit bus and the sequencer 104 is configured to retrieve instructions from the memory 102 having a length of thirty-two (32) bits. The bus 106 is coupled to a first instruction execution unit 108, a second instruction execution unit 110, a third instruction execution unit 112, and a fourth instruction execution unit 114. FIG. 1 indicates that each instruction execution unit 108, 110, 112, 114 can be coupled to a general register file 116 via a first bus 118. The general register file 116 can also be coupled to the sequencer 104 and the memory 102 via a second bus 120.

In a particular embodiment, the memory 102 includes a first instruction cache 122, a second instruction cache 124, a third instruction cache 126, a fourth instruction cache 128, a fifth instruction cache 130, and a sixth instruction cache 132. During operation, the instruction caches 122, 124, 126, 128, 130, 132 can be accessed independently of each other by the sequencer 104. Additionally, in a particular embodiment, each instruction cache 122, 124, 126, 128, 130, 132 includes a plurality of instructions.

As illustrated in FIG. 1, the memory 102 can include an instruction queue 134 that includes an instruction queue coupled to each instruction cache 122, 124, 126, 128, 130, 132. In particular, the instruction queue 134 includes a first instruction queue 136 that is associated with the first instruction cache 122, a second instruction queue 138 that is associated with the second instruction cache 124, a third instruction queue 140 that is associated with the third instruction cache 126, a fourth instruction queue 142 that is associated with the fourth instruction cache 128, a fifth instruction queue 144 that is associated with the fifth instruction cache 130, and a sixth instruction queue 146 that is associated with the sixth instruction cache 132.

During operation, the sequencer 104 can fetch instructions from each instruction cache 122, 124, 126, 128, 130, 132 via the instruction queue 134. In a particular embodiment, the sequencer 104 fetches instructions from the instruction queues 136, 138, 140, 142, 144, 146 in order from the first instruction queue 136 to the sixth instruction queue 146. After fetching an instruction from the sixth instruction queue 146, the sequencer 104 returns to the first instruction queue 136 and continues fetching instructions from the instruction queues 136, 138, 140, 142, 144, 146 in order.

In a particular embodiment, the sequencer 104 operates in a first mode as a 2-way superscalar sequencer that supports superscalar instructions. Further, in a particular embodiment, the sequencer also operates in a second mode that supports very long instruction word (VLIW) instructions. In particular, the sequencer can operate as a 4-way VLIW sequencer. In a particular embodiment, the first instruction execution unit 108 can execute a load instruction, a store instruction, and an arithmetic logic unit (ALU) instruction. The second instruction execution unit 110 can execute a load instruction and an ALU instruction. Also, the third instruction execution unit can execute a multiply instruction, a multiply-accumulate instruction (MAC), an ALU instruction, a program redirect construct, and a transfer register (CR) instruction. FIG. 1 further indicates that the fourth instruction execution unit 114 can execute a shift (S) instruction, an ALU instruction, a program redirect construct, and a CR instruction. In a particular embodiment, the program redirect construct can be a zero overhead loop, a branch instruction, a jump (J) instruction, etc.

As depicted in FIG. 1, the general register 116 includes a first unified register file 148, a second unified register file 150, a third unified register file 152, a fourth unified register file 154, a fifth unified register file 156, and a sixth unified register file 158. Each unified register file 148, 150, 152, 154, 156, 158 corresponds to an instruction cache 122, 124, 126, 128, 130, 132 within the memory 102. Further, in a particular embodiment, each unified register file 148, 150, 152, 154, 156, 158 has the same construction and includes a number of data operands and a number of address operands.

During operation of the digital signal processor 100, instructions are fetched from the memory 102 by the sequencer 104 and operands are fetched from the register files 148, 150, 152, 154, 156, 158. Further, instructions and operands are sent to designated instruction execution units 108, 110, 112, 114, and executed at the instruction execution unit 108, 110, 112, 114. Further, one or more operands are retrieved from the general register 116, e.g., one of the unified register files 148, 150, 152, 154, 156, 158 and used during the execution of the instructions. The results at each instruction execution unit 108, 110, 112, 114 can be written to the general register 116, i.e., to one of the unified register files 148, 150, 152, 154, 156, 158.

Figure 2:
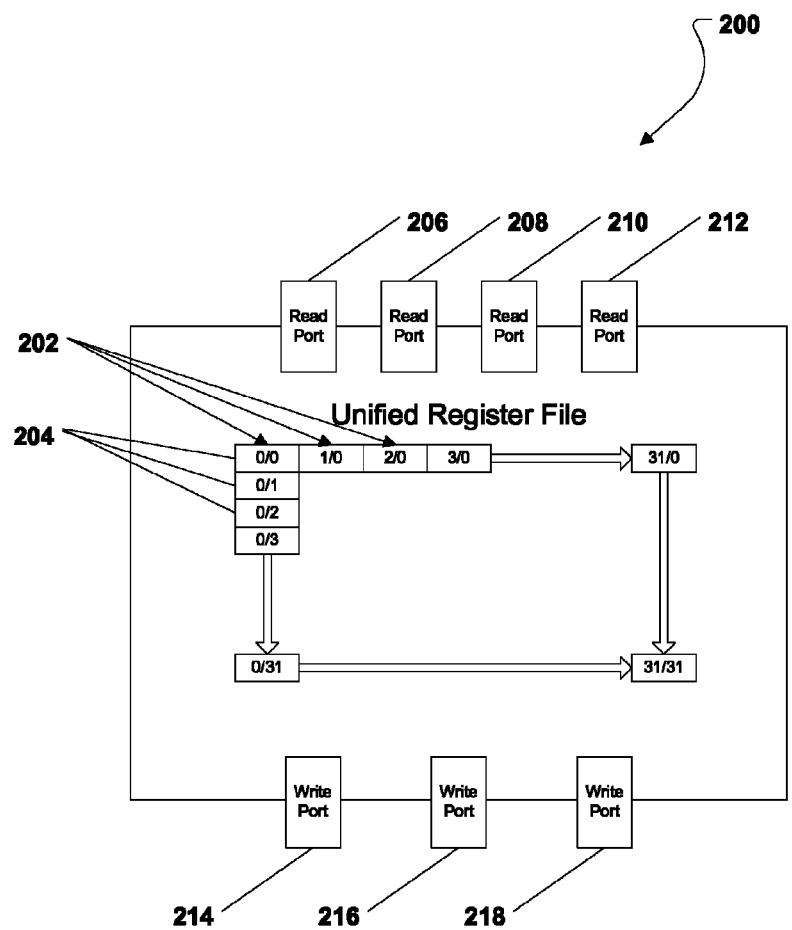
FIG. 2 is a general diagram of an exemplary unified non-partitioned register file of the digital signal processor shown in FIG. 1.

Referring to FIG. 2, an exemplary, non-limiting embodiment of a unified non-partitioned register file is shown and is generally designated 200. As shown, the unified non-partitioned register file 200 includes thirty-two (32) registers 202 and each register includes thirty-two (32) bits 204. FIG. 2 indicates that the unified non-partitioned register file 200 can include a first data read port 206, a second data read port 208, a third data read port 210, and a fourth data read port 212. Further, the unified non-partitioned register file 200 includes a first data write port 214, a second data write port 216, and a third data write port 218.

In a particular embodiment, one or more instructions can be associated with the unified non-partitioned register file 200. Further, during the execution of each instruction, the unified non-partitioned register file 200 associated with each instruction can be accessed via the four read ports 206, 208, 210, 212 and the three write ports 214, 216, 218. However, due to the interleaved multithreading method described below, more than four operands for an instruction can be retrieved from the unified non-partitioned register file 200 via the four data read ports 206, 208, 210, 212.

Figure 3:
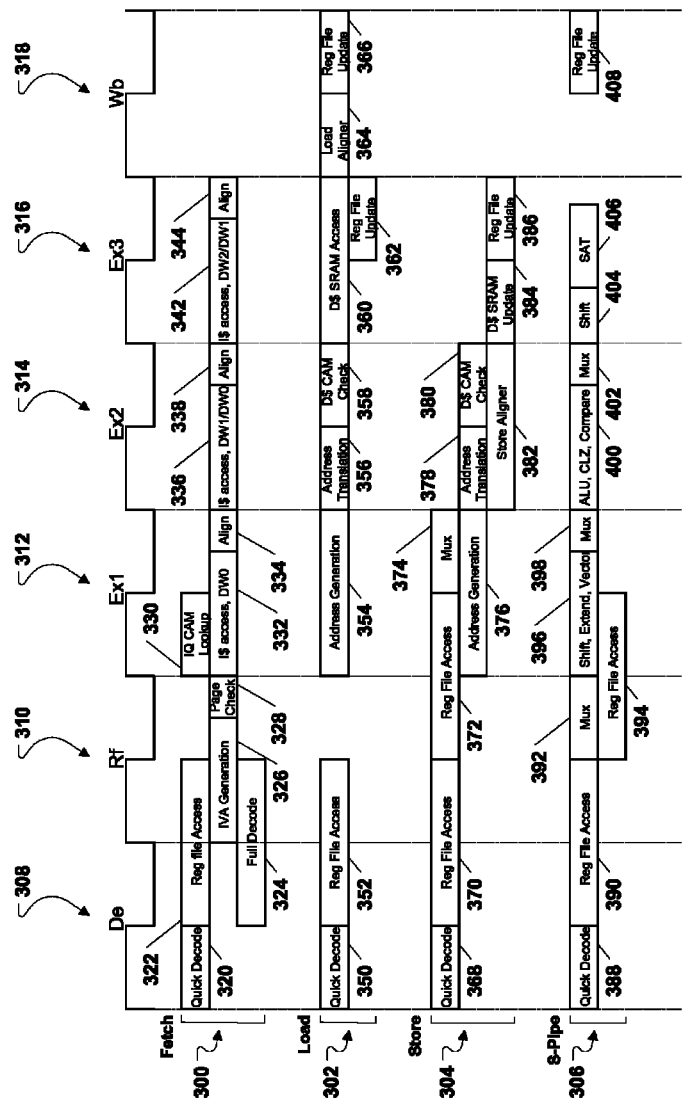
FIG. 3 is a diagram illustrating a detailed interleaved multithreading operation of the digital signal processor shown in FIG. 1.

Referring now to FIG. 3, a detailed method of interleaved multithreading for a digital signal processor is shown. FIG. 3 shows that the method includes a branch routine 300, a load routine 302, a store routine 304, and an s-pipe routine 306. Each routine 300, 302, 304, 306 includes a plurality of steps that are performed during six clock cycles for each instruction fetched from an instruction queue by a sequencer. In a particular embodiment, the clock cycles include a decode clock cycle 308, a register file access clock cycle 310, a first execution clock cycle 312, a second execution clock cycle 314, a third execution clock cycle 316, and a writeback clock cycle 318. Further, each clock cycle includes a first portion and a second portion.

FIG. 3 shows that during the branch routine 300, at block 320, a quick decode for the instruction is performed within a sequencer during a first portion of the decode clock cycle. At block 322, during the second portion of the decode clock cycle 308, the sequencer accesses a register file, e.g., starts a register file access for a first operand. The register access of block 322 finishes within the register file access clock cycle 310 and the first operand is retrieved from the register file. In a particular embodiment, the sequencer accesses the register file via a first data read port. As shown, the register file access of block 322 occurs during the second portion of the decode clock cycle 308 and the first portion of the register file access clock cycle 310. As such, the register file access overlaps the decode clock cycle 308 and the register file access clock cycle 310.

At block 324, also during the decode clock cycle 308, the sequencer begins a full decode for the instruction. The full decode performed by the sequencer occurs within the second portion of the decode clock cycle 308 and the first portion of the register file access clock cycle 310.

During the register file access clock cycle 310, at block 326, the sequencer generates an instruction virtual address (IVA). Thereafter, at block 328, the sequencer performs a page check in order to determine the physical address page associated with a virtual address page number. Moving to the first execution clock cycle 312, at block 330, the sequencer performs an instruction queue lookup. At block 332, the sequencer accesses an instruction cache a first time and retrieves a first double-word for the instruction. In a particular embodiment, each instruction includes three double-words, e.g., a first double-word, a second double-word, and a third double-word. At block 334, during the first execution clock cycle 312, the sequencer aligns the double-word coming from the instruction cache.

Continuing to the second execution clock cycle 314, the sequencer accesses the instruction cache a second time in order to retrieve the second double-word for the instruction at block 336. Next, at block 338, the sequencer aligns the double-word retrieved from the instruction cache.

Proceeding to the third execution clock cycle 316, the sequencer accesses the instruction cache a third time in order to retrieve a third double-word at block 342. After the sequencer accesses the instruction cache the third time, the sequencer aligns the third double-word, at block 344.

As illustrated in FIG. 3, during the load routine 302, at block 350, the sequencer performs a quick decode for the instruction during the first portion of the decode clock cycle 308. At block 352, during the second portion of the decode clock cycle 308, the sequencer begins a register file access. As shown, the second register access by the sequencer spans two clock cycles, i.e., including the second portion of the decode clock cycle 308 and the first portion of register file access clock cycle 310. As such, the register file access ends within the register file access clock cycle 310 and a second operand can be retrieved. Next, during the first execution cycle 312, at block 354, an address generation unit within a first instruction execution unit generates a first virtual address for the instruction based on the previously read register file content.

At block 356, during the second execution clock cycle 314, a data translation look-aside buffer (DTLB) performs an address translation for the first virtual address in order to generate a first physical address. Still within the second execution clock cycle 314, at block 358, the sequencer performs a tag check.

Moving to the third execution cycle 316, the sequencer accesses a data cache static random access memory (SRAM) in order to read data out of the SRAM, at block 360. Also, within the third execution cycle, at block 362, the sequencer updates the register file associated with the instruction a first time via a first data write port. In a particular embodiment, the sequencer updates the register file with the results of a post increment address. Next, during the writeback clock cycle 318, at block 364 a load aligner shifts data to align the data within the double-word. At block 366, also within the writeback clock cycle 318, the sequencer updates the register file for the instruction a second time via the first data write port with data loaded from the cache.

FIG. 3 shows that during the store routine 304, at block 368, the sequencer performs a quick decode for the instruction during the decode clock cycle 308. Further, during the decode clock cycle 308, at block 370, the sequencer accesses a register file associated with the instruction a third time via a third data read port. The register access of block 370 occurs within the last portion of the decode clock cycle 308 and the first portion of the register file access clock cycle 310. As such, the register file begins within the decode clock cycle 308 and ends within the register file access clock cycle 310. In a particular embodiment, a third operand is retrieved from the register file during the register file access clock cycle 310.

As depicted in FIG. 3, during the second portion of the register file access clock cycle 310, the sequencer access the register file for the instruction a fourth time via the third data read port at block 372. The fourth register file commences within the register file access clock cycle 310 and ends within the first execution clock cycle 312 wherein a fourth operand is retrieved from the register. In a particular embodiment, the third data read port is used to access the register in order to retrieve the third operand and the fourth operand. At block 374, a portion of the data from the sequencer is multiplexed at a multiplexer. Also, during the first execution clock cycle 312, at block 376, a second address generation unit within a second instruction execution unit generates a virtual address for the instruction based on the previously read data from the register file.

Proceeding to the second execution clock cycle 314, during the store routine, at block 378, the data translation look-aside buffer (DTLB) translates the previously generated virtual address for the instruction into a physical address. At block 380, within the second execution clock cycle 314, the sequencer performs a data cache tag check. Also, during the second execution clock cycle 314, at block 382, a store aligner aligns a store data to the appropriate byte, half-word, or word boundary within a double-word before writing the data to the data cache. Moving to the third execution clock cycle 316, at block 384, the sequencer updates the data cache static random access memory. Then, at block 386, the sequencer updates the register file for the instruction a third time via a second data write port with the results of executing the instruction during the third execution clock cycle 316.

As illustrated in FIG. 3, the s-pipe routine 306 begins during the decode clock cycle 308, at block 388, where a quick decode is performed for the instruction. At block 390, the sequencer accesses the register file for the instruction a fifth time via a fourth data read port. The fifth register file access also spans two clock cycles and begins within the second portion of the decode clock cycle 308 and ends within the first portion of the register file access clock cycle 310 wherein a fifth operand is retrieved. Still during the register file access clock cycle 310, a portion of the data from the register file for the instruction is multiplexed at a multiplexer. Also, during the register file access clock cycle 310, the sequencer accesses the register file for the instruction a sixth time via the fourth data read port at block 394. The sixth access to the register file begins within the second portion of the register file access clock cycle 310 and ends within the first portion of the first execution clock cycle 312. A sixth operand is retrieved during the first execution clock cycle 312.

Proceeding to the second execution clock cycle 314, at block 396, data retrieved during the fifth register file access and the sixth register file access is sent to a 64-bit shifter, a vector unit, and a sign/zero extender. Also, during the first execution clock cycle, at block 398, the data from the shifter, the vector unit, and the sign/zero extender is multiplexed.

Moving to the second execution clock cycle 314, the multiplexed data from the shifter, the vector unit, and the sign/zero extender is sent to an arithmetic logic unit, a count leading zeros unit, or a comparator at block 400. At block 402, the data from the arithmetic logic unit, the count leading zeros unit, and the comparator is multiplexed at a single multiplexer. After the data is multiplexed, the shifter shifts the multiplexed data in order to multiply the data by 2, 4, 8, etc. at block 404 during the third execution clock cycle 316. Then, at block 406, the output of the shifter is saturated. During the writeback clock cycle 318, at block 408, the register file for the instruction is updated a fourth time via a third write data port.

In a particular embodiment, as illustrated in FIG. 3, the method of interleaved multithreading for the digital signal processor utilizes four read ports for each register and three write ports for each register. Due to recycling of read ports and write ports, six operands can be retrieved via the four read data ports. Further, four results can be updated to the register file via three write data ports.

Figure 4:
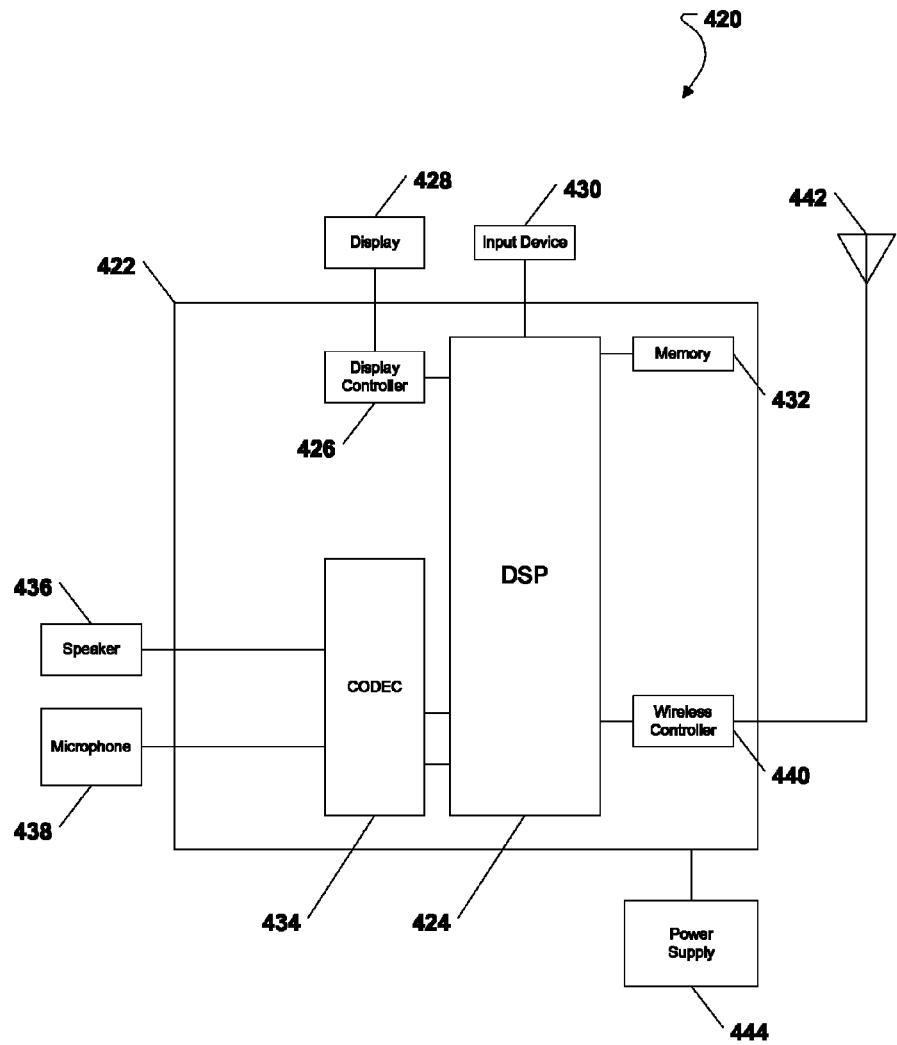
FIG. 4 is a general diagram of a portable communication device incorporating a digital signal processor.

FIG. 4 illustrates an exemplary, non-limiting embodiment of a portable communication device that is generally designated 420. As illustrated in FIG. 4, the portable communication device includes an on-chip system 422 that includes a digital signal processor 424. In a particular embodiment, the digital signal processor 424 is the digital signal processor shown in FIG. 1 and described herein. FIG. 4 also shows a display controller 426 that is coupled to the digital signal processor 424 and a display 428. Moreover, an input device 430 is coupled to the digital signal processor 424. As shown, a memory 432 is coupled to the digital signal processor 424. Additionally, a coder/decoder (CODEC) 434 can be coupled to the digital signal processor 424. A speaker 436 and a microphone 438 can be coupled to the CODEC 430.

FIG. 4 also indicates that a wireless controller 440 can be coupled to the digital signal processor 424 and a wireless antenna 442. In a particular embodiment, a power supply 444 is coupled to the on-chip system 422. Moreover, in a particular embodiment, as illustrated in FIG. 4, the display 428, the input device 430, the speaker 436, the microphone 438, the wireless antenna 442, and the power supply 444 are external to the on-chip system 422. However, each is coupled to a component of the on-chip system 422.

In a particular embodiment, the digital signal processor 424 utilizes interleaved multithreading to process instructions associated with program threads necessary to perform the functionality and operations needed by the various components of the portable communication device 420. For example, when a wireless communication session is established via the wireless antenna a user can speak into the microphone 438. Electronic signals representing the user's voice can be sent to the CODEC 434 to be encoded. The digital signal processor 424 can perform data processing for the CODEC 434 to encode the electronic signals from the microphone. Further, incoming signals received via the wireless antenna 442 can be sent to the CODEC 434 by the wireless controller 440 to be decoded and sent to the speaker 436. The digital signal processor 424 can also perform the data processing for the CODEC 434 when decoding the signal received via the wireless antenna 442.

Further, before, during, or after the wireless communication session, the digital signal processor 424 can process inputs that are received from the input device 430. For example, during the wireless communication session, a user may be using the input device 430 and the display 428 to surf the Internet via a web browser that is embedded within the memory 432 of the portable communication device 420. The digital signal processor 424 can interleave various program threads that are used by the input device 430, the display controller 426, the display 428, the CODEC 434 and the wireless controller 440, as described herein, to efficiently control the operation of the portable communication device 420 and the various components therein. Many of the instructions associated with the various program threads are executed concurrently during one or more clock cycles. As such, the power and energy consumption due to wasted clock cycles is substantially decreased.

Figure 5:
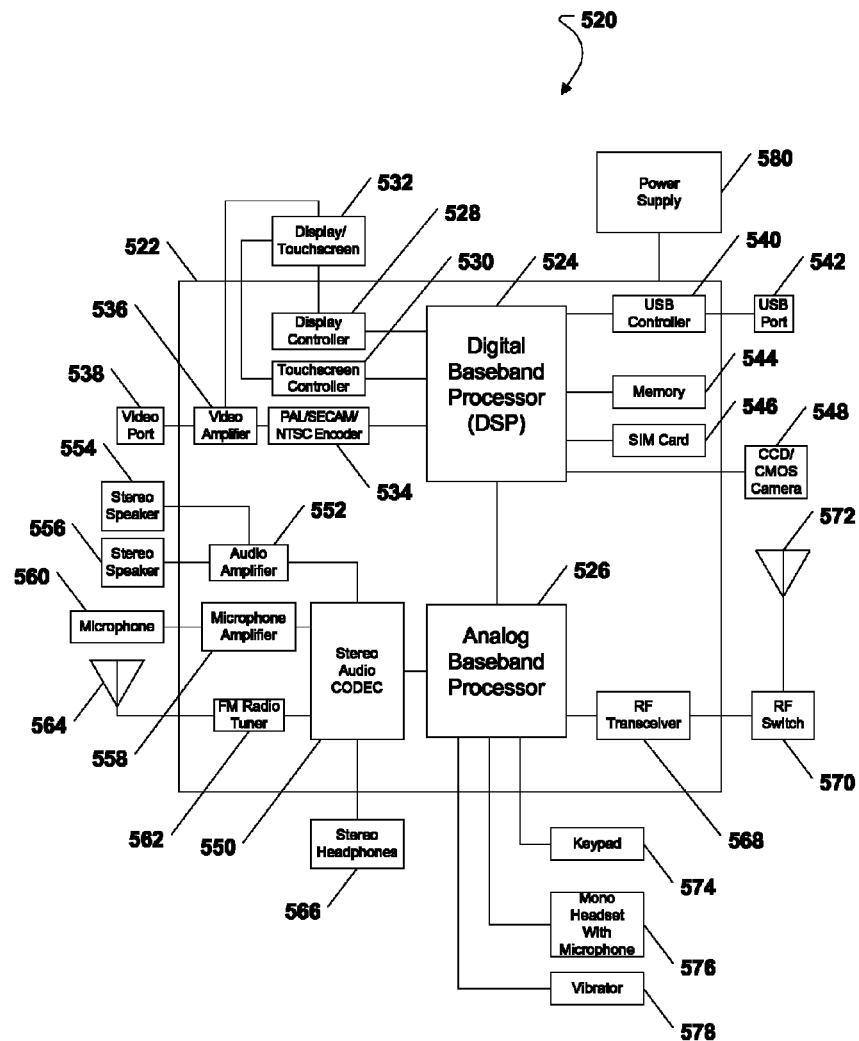
FIG. 5 is a general diagram of an exemplary cellular telephone incorporating a digital signal processor.

Referring to FIG. 5, an exemplary, non-limiting embodiment of a cellular telephone is shown and is generally designated 520. As shown, the cellular telephone 520 includes an on-chip system 522 that includes a digital baseband processor 524 and an analog baseband processor 526 that are coupled together. In a particular embodiment, the digital baseband processor 524 is a digital signal processor, e.g., the digital signal processor shown in FIG. 1 and described herein. As illustrated in FIG. 5, a display controller 528 and a touchscreen controller 530 are coupled to the digital baseband processor 524. In turn, a touchscreen display 532 external to the on-chip system 522 is coupled to the display controller 528 and the touchscreen controller 530.

FIG. 5 further indicates that a video encoder 534, e.g., a phase alternating line (PAL) encoder, a sequential couleur a memoire (SECAM) encoder, or a national television system(s) committee (NTSC) encoder, is coupled to the digital baseband processor 524. Further, a video amplifier 536 is coupled to the video encoder 534 and the touchscreen display 532. Also, a video port 538 is coupled to the video amplifier 536. As depicted in FIG. 5, a universal serial bus (USB) controller 540 is coupled to the digital baseband processor 524. Also, a USB port 542 is coupled to the USB controller 540. A memory 544 and a subscriber identity module (SIM) card 546 can also be coupled to the digital baseband processor 524. Further, as shown in FIG. 5, a digital camera 548 can be coupled to the digital baseband processor 524. In an exemplary embodiment, the digital camera 548 is a charge-coupled device (CCD) camera or a complementary metal-oxide semiconductor (CMOS) camera.

As further illustrated in FIG. 5, a stereo audio CODEC 550 can be coupled to the analog baseband processor 526. Moreover, an audio amplifier 552 can coupled to the to the stereo audio CODEC 550. In an exemplary embodiment, a first stereo speaker 554 and a second stereo speaker 556 are coupled to the audio amplifier 552. FIG. 5 shows that a microphone amplifier 558 can be also coupled to the stereo audio CODEC 550. Additionally, a microphone 560 can be coupled to the microphone amplifier 558. In a particular embodiment, a frequency modulation (FM) radio tuner 562 can be coupled to the stereo audio CODEC 550. Also, an FM antenna 564 is coupled to the FM radio tuner 562. Further, stereo headphones 566 can be coupled to the stereo audio CODEC 550.

FIG. 5 further indicates that a radio frequency (RF) transceiver 568 can be coupled to the analog baseband processor 526. An RF switch 570 can be coupled to the RF transceiver 568 and an RF antenna 572. As shown in FIG. 5, a keypad 574 can be coupled to the analog baseband processor 526. Also, a mono headset with a microphone 576 can be coupled to the analog baseband processor 526. Further, a vibrator device 578 can be coupled to the analog baseband processor 526. FIG. 5 also shows that a power supply 580 can be coupled to the on-chip system 522. In a particular embodiment, the power supply 580 is a direct current (DC) power supply that provides power to the various components of the cellular telephone 520 that require power. Further, in a particular embodiment, the power supply is a rechargeable DC battery or a DC power supply that is derived from an alternating current (AC) to DC transformer that is connected to an AC power source.

In a particular embodiment, as depicted in FIG. 5, the touchscreen display 532, the video port 538, the USB port 542, the camera 548, the first stereo speaker 554, the second stereo speaker 556, the microphone 560, the FM antenna 564, the stereo headphones 566, the RF switch 570, the RF antenna 572, the keypad 574, the mono headset 576, the vibrator 578, and the power supply 580 are external to the on-chip system 522. Moreover, in a particular embodiment, the digital baseband processor 524 and the analog baseband processor 526 can use interleaved multithreading, described herein, in order to process the various program threads associated with one or more of the different components associated with the cellular telephone 520.

Figure 6:
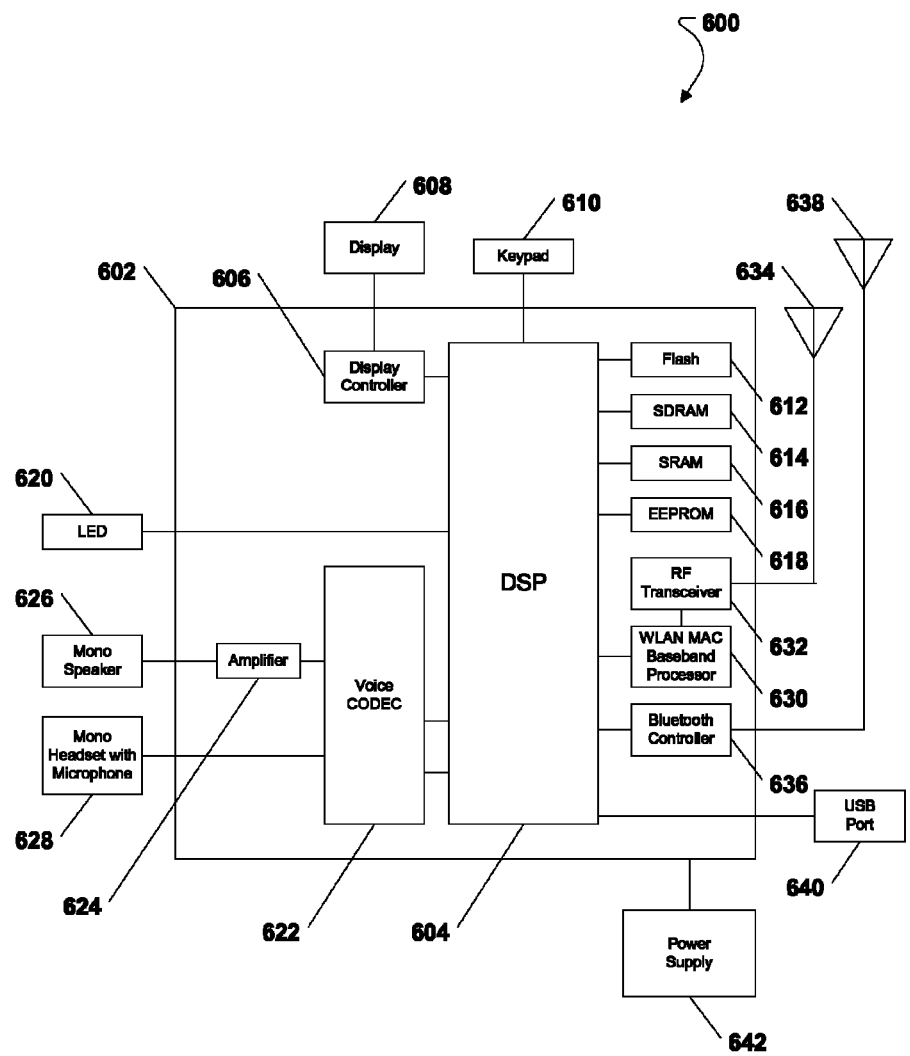
FIG. 6 is a general diagram of an exemplary wireless Internet Protocol telephone incorporating a digital signal processor.

Referring to FIG. 6, an exemplary, non-limiting embodiment of a wireless Internet protocol (IP) telephone is shown and is generally designated 600. As shown, the wireless IP telephone 600 includes an on-chip system 602 that includes a digital signal processor (DSP) 604. In a particular embodiment, the DSP 604 is the digital signal processor shown in FIG. 1 and described herein. As illustrated in FIG. 6, a display controller 606 is coupled to the DSP 604 and a display 608 is coupled to the display controller 606. In an exemplary embodiment, the display 608 is a liquid crystal display (LCD). FIG. 6 further shows that a keypad 610 can be coupled to the DSP 604.

As further depicted in FIG. 6, a flash memory 612 can be coupled to the DSP 604. A synchronous dynamic random access memory (SDRAM) 614, a static random access memory (SRAM) 616, and an electrically erasable programmable read only memory (EEPROM) 618 can also be coupled to the DSP 604. FIG. 6 also shows that a light emitting diode (LED) 620 can be coupled to the DSP 604. Additionally, in a particular embodiment, a voice CODEC 622 can be coupled to the DSP 604. An amplifier 624 can be coupled to the voice CODEC 622 and a mono speaker 626 can be coupled to the amplifier 624. FIG. 6 further indicates that a mono headset 628 can also be coupled to the voice CODEC 622. In a particular embodiment, the mono headset 628 includes a microphone.

FIG. 6 also illustrates that a wireless local area network (WLAN) baseband processor 630 can be coupled to the DSP 604. An RF transceiver 632 can be coupled to the WLAN baseband processor 630 and an RF antenna 634 can be coupled to the RF transceiver 632. In a particular embodiment, a Bluetooth® controller 636 can also be coupled to the DSP 604 and a Bluetooth® antenna 638 can be coupled to the controller 636. FIG. 6 also shows that a USB port 640 can also be coupled to the DSP 604. Moreover, a power supply 642 is coupled to the on-chip system 602 and provides power to the various components of the wireless IP telephone 600 via the on-chip system 602.

In a particular embodiment, as indicated in FIG. 6, the display 608, the keypad 610, the LED 620, the mono speaker 626, the mono headset 628, the RF antenna 634, the Bluetooth® antenna 638, the USB port 640, and the power supply 642 are external to the on-chip system 602. However, each of these components is coupled to one or more components of the on-chip system. Further, in a particular embodiment, the digital signal processor 604 can use interleaved multithreading, as described herein, in order to process the various program threads associated with one or more of the different components associated with the IP telephone 600.

Figure 7:
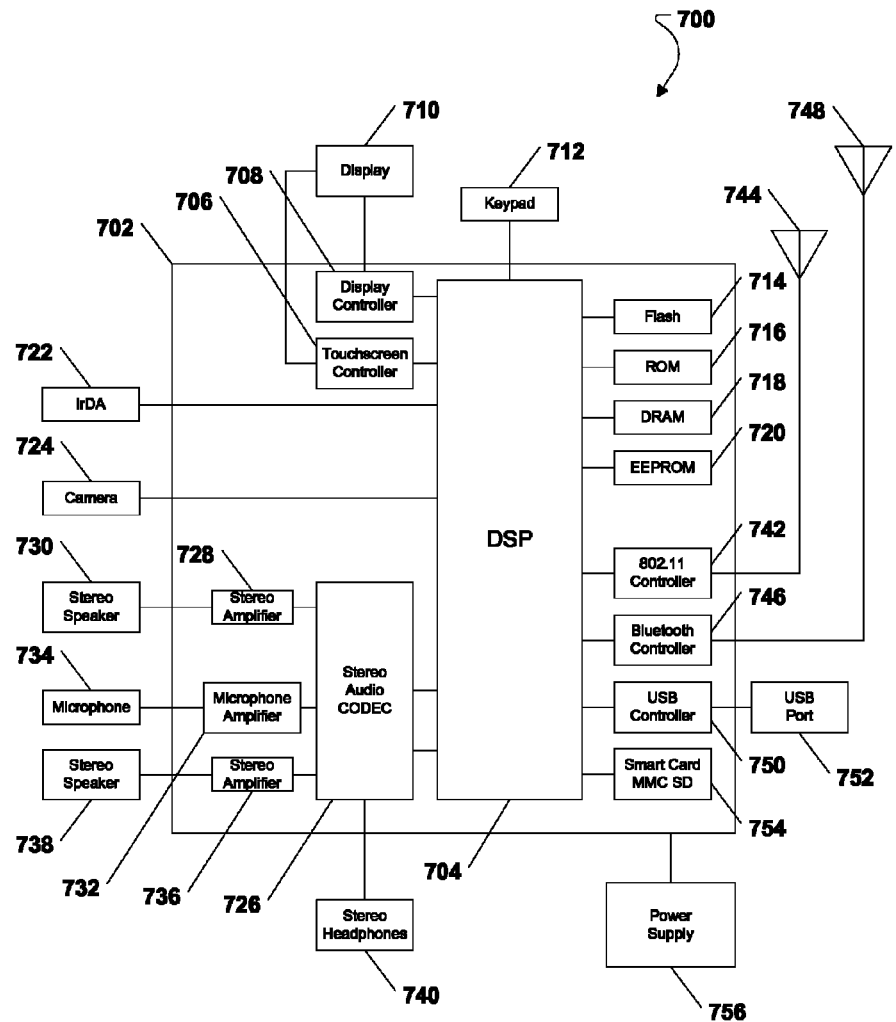
FIG. 7 is a general diagram of an exemplary portable digital assistant incorporating a digital signal processor.

FIG. 7 illustrates an exemplary, non-limiting embodiment of a portable digital assistant (PDA) that is generally designated 700. As shown, the PDA 700 includes an on-chip system 702 that includes a digital signal processor (DSP) 704. In a particular embodiment, the DSP 704 is the digital signal processor shown in FIG. 1 and described herein. As depicted in FIG. 7, a touchscreen controller 706 and a display controller 708 are coupled to the DSP 704. Further, a touchscreen display is coupled to the touchscreen controller 706 and to the display controller 708. FIG. 7 also indicates that a keypad 712 can be coupled to the DSP 704.

As further depicted in FIG. 7, a flash memory 714 can be coupled to the DSP 704. Also, a read only memory (ROM) 716, a dynamic random access memory (DRAM) 718, and an electrically erasable programmable read only memory (EEPROM) 720 can be coupled to the DSP 704. FIG. 7 also shows that an infrared data association (IrDA®) port 722 can be coupled to the DSP 704. Additionally, in a particular embodiment, a digital camera 724 can be coupled to the DSP 704.

As shown in FIG. 7, in a particular embodiment, a stereo audio CODEC 726 can be coupled to the DSP 704. A first stereo amplifier 728 can be coupled to the stereo audio CODEC 726 and a first stereo speaker 730 can be coupled to the first stereo amplifier 728. Additionally, a microphone amplifier 732 can be coupled to the stereo audio CODEC 726 and a microphone 734 can be coupled to the microphone amplifier 732. FIG. 7 further shows that a second stereo amplifier 736 can be coupled to the stereo audio CODEC 726 and a second stereo speaker 738 can be coupled to the second stereo amplifier 736. In a particular embodiment, stereo headphones 740 can also be coupled to the stereo audio CODEC 726.

FIG. 7 also illustrates that an 802.11 controller 742 can be coupled to the DSP 704 and an 802.11 antenna 744 can be coupled to the 802.11 controller 742. Moreover, a Bluetooth® controller 746 can be coupled to the DSP 704 and a Bluetooth® antenna 748 can be coupled to the Bluetooth® controller 746. As depicted in FIG. 7, a USB controller 750 can be coupled to the DSP 704 and a USB port 752 can be coupled to the USB controller 750. Additionally, a smart card 754, e.g., a multimedia card (MMC) or a secure digital card (SD) can be coupled to the DSP 704. Further, as shown in FIG. 7, a power supply 756 can be coupled to the on-chip system 702 and can provide power to the various components of the PDA 700 via the on-chip system 702.

In a particular embodiment, as indicated in FIG. 7, the display 710, the keypad 712, the IrDA® port 722, the digital camera 724, the first stereo speaker 730, the microphone 734, the second stereo speaker 738, the stereo headphones 740, the 802.11 antenna 744, the Bluetooth® antenna 748, the USB port 752, and the power supply 750 are external to the on-chip system 702. However, each of these components is coupled to one or more components on the on-chip system. Additionally, in a particular embodiment, the digital signal processor 704 can use interleaved multithreading, described herein, in order to process the various program threads associated with one or more of the different components associated with the portable digital assistant 700.

Figure 8:
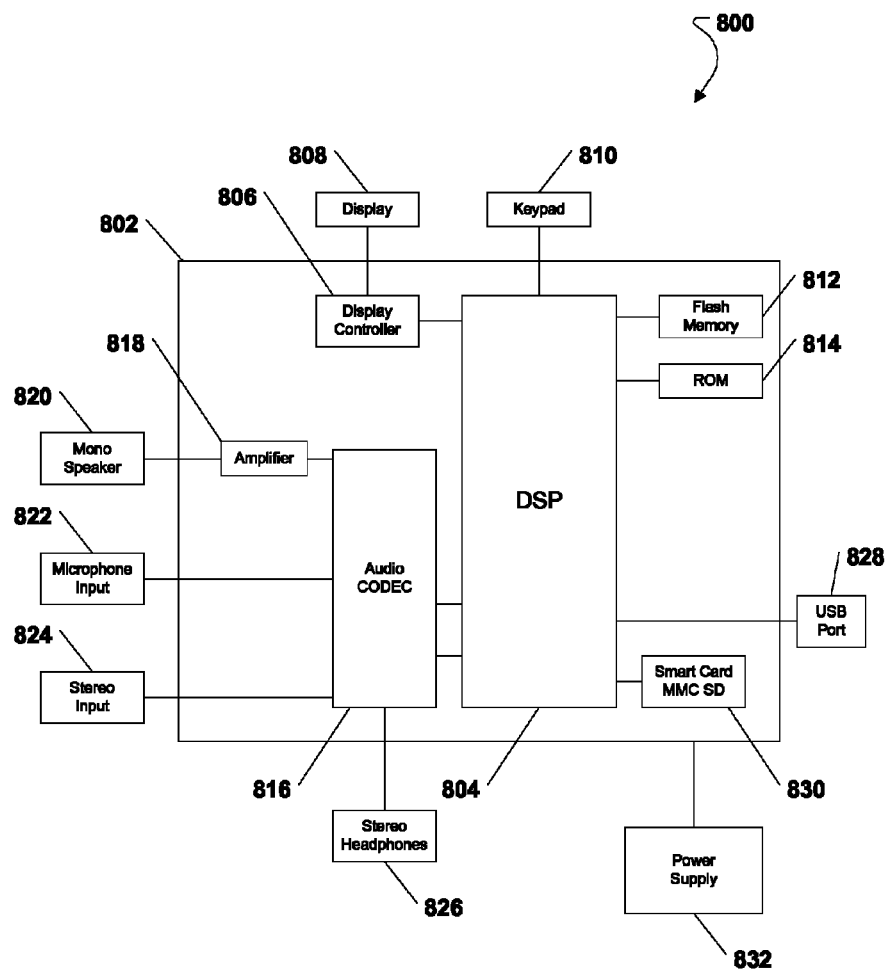
FIG. 8 is a general diagram of an exemplary audio file player incorporating a digital signal processor.

Referring to FIG. 8, an exemplary, non-limiting embodiment of an audio file player, such as moving pictures experts group audio layer-3 (MP3) player is shown and is generally designated 800. As shown, the audio file player 800 includes an on-chip system 802 that includes a digital signal processor (DSP) 804. In a particular embodiment, the DSP 804 is the digital signal processor shown in FIG. 1 and described herein. As illustrated in FIG. 8, a display controller 806 is coupled to the DSP 804 and a display 808 is coupled to the display controller 806. In an exemplary embodiment, the display 808 is a liquid crystal display (LCD). FIG. 8 further shows that a keypad 810 can be coupled to the DSP 804.

As further depicted in FIG. 8, a flash memory 812 and a read only memory (ROM) 814 can be coupled to the DSP 804. Additionally, in a particular embodiment, an audio CODEC 816 can be coupled to the DSP 804. An amplifier 818 can be coupled to the audio CODEC 816 and a mono speaker 820 can be coupled to the amplifier 818. FIG. 8 further indicates that a microphone input 822 and a stereo input 824 can also be coupled to the audio CODEC 816. In a particular embodiment, stereo headphones 826 can also be coupled to the audio CODEC 816.

FIG. 8 also indicates that a USB port 828 and a smart card 830 can be coupled to the DSP 804. Additionally, a power supply 832 can be coupled to the on-chip system 802 and can provide power to the various components of the audio file player 800 via the on-chip system 802.

In a particular embodiment, as indicated in FIG. 8, the display 808, the keypad 810, the mono speaker 820, the microphone input 822, the stereo input 824, the stereo headphones 826, the USB port 828, and the power supply 832 are external to the on-chip system 802. However, each of these components is coupled to one or more components on the on-chip system. Also, in a particular embodiment, the digital signal processor 804 can use interleaved multithreading, described herein, in order to process the various program threads associated with one or more of the different components associated with the audio file player 800.

With the configuration of structure disclosed herein, the register files for a digital processor operating in an interleaved multi-threaded environment provide a plurality of register files that have four data read ports and three data write ports each. Each register file includes data operands and address operands and each register file can be used to support a particular program thread. During operation, a particular instruction may access up to six operands via the four data read ports. For example, four operands may be retrieved during one clock cycle and two operands may be retrieved during a subsequent clock cycle. The use of only four data read ports substantially reduces the size of the memory required by the digital signal processor. As such, costs associated with manufacturing digital signal processor that include the register files disclosed herein are substantially reduced. Further, power consumption of a power source that is coupled to the digital signal processor is substantially reduced.

Those of skill would further appreciate that the various illustrative logical blocks, configurations, modules, circuits, and algorithm steps described in connection with the embodiments disclosed herein may be implemented as electronic hardware, computer software, or combinations of both. To clearly illustrate this interchangeability of hardware and software, various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in RAM memory, flash memory, ROM memory, PROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a computing device or a user terminal. In the alternative, the processor and the storage medium may reside as discrete components in a computing device or user terminal.

The previous description of the disclosed embodiments is provided to enable any person skilled in the art to make or use the present disclosure. Various modifications to these embodiments will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features as defined by the following claims.

What is claimed is:

1. A processor device comprising:
   a memory;
   a sequencer responsive to the memory, the sequencer supporting very long instruction word (VLIW) type instructions, wherein at least one VLIW instruction uses a number of operands during execution;
   a plurality of instruction execution units responsive to the sequencer; and
   a plurality of register files, each of the plurality of register files including a plurality of registers, the plurality of register files coupled to the plurality of instruction execution units;
   wherein each of the plurality of register files includes a number of data read ports; and
   wherein the number of data read ports of each of the plurality of register files is less than the number of operands used by the at least one VLIW instruction.

2. The processor device of claim 1, wherein the sequencer further supports superscalar type instructions and wherein at least one superscalar instruction uses a number of operands during execution.

3. The processor device of claim 2, wherein the number of data read ports of each of the plurality of register files is less than a number of operands used by the at least one superscalar instruction.

4. The processor device of claim 3, wherein the number of operands used during the execution of the at least one VLIW instruction or the at least one superscalar instruction is six and the number of data read ports is four.

5. The processor device of claim 4, wherein each of the plurality of register files includes less than four data write ports.

6. The processor device of claim 5, wherein each of the plurality of register files includes three data write ports.

7. The processor device of claim 1, wherein the plurality of register files comprises six register files.

8. The processor device of claim 7, wherein the memory includes six instruction caches and each instruction cache is associated with one of the six register files.

9. The processor device of claim 8, wherein the memory includes six instruction queues, wherein each instruction queue is associated with a single instruction cache.

10. The processor device of claim 9, wherein each instruction queue is coupled to the sequencer.

11. A multithreaded processor device comprising:
    a plurality of instruction caches, each instruction cache is associated with a separate program thread;
    a sequencer sequentially fetching instructions from the plurality of instruction caches;
    a plurality of instruction execution units responsive to the sequencer; and
    a first register file including a first plurality of registers, the first register file coupled to each of the plurality of instruction execution units, the first register file supporting execution of a first program thread to be executed, and associated with one of the plurality of instruction caches, the first register file including data read ports, the plurality of instruction execution units configured to access the first register file more times than the number of data read ports within a period of time before the next sequential fetching of instructions from the one of plurality of instruction caches.

12. The multithreaded processor device of claim 11, further comprising:
    a second register file including a second plurality of registers, the second register file coupled to each of the plurality of instruction execution units, the second register file supporting execution of a second program thread to be executed, the second register file including no more than four data read ports;
    a third register file including a third plurality of registers, the third register file coupled to each of the plurality of instruction execution units, the third register file supporting execution of a third program thread to be executed, the third register file including no more than four data read ports;
    a fourth register file including a fourth plurality of registers, the fourth register file coupled to each of the plurality of instruction execution units, the fourth register file supporting execution of a fourth program thread to be executed, the fourth register file including no more than four data read ports;
    a fifth register file including a fifth plurality of registers, the fifth register file coupled to each of the plurality of instruction execution units, the fifth register file supporting execution of a fifth program thread to be executed, the fifth register file including no more than four data read ports; and
    a sixth register file including a sixth plurality of registers, the sixth register file coupled to each of the plurality of instruction execution units, the sixth register file supporting execution of a sixth program thread to be executed, the sixth register file including no more than four data read ports.

13. The multithreaded processor device of claim 12, wherein each register file includes four data read ports.

14. The multithreaded processor device of claim 12, wherein each register file includes no more than three data write ports.

15. The multithreaded processor device of claim 14, wherein each register file includes three data write ports.

16. A portable communication device, comprising:
a digital signal processor;
wherein the digital signal processor includes:
    a memory;
    a sequencer responsive to the memory to fetch a program instruction having a number of operands;
    at least one instruction execution unit responsive to the sequencer; and
    a plurality of register files coupled to the at least one instruction execution unit, each of the plurality of register files including no more than four data read ports and wherein the number of operands is greater than four.

17. The portable communication device of claim 16, wherein each of the plurality of register files includes no more than three data write ports.

18. The portable communication device of claim 16, wherein the sequencer supports very long instruction word (VLIW) type instructions in a first mode of operation and wherein the sequencer supports superscalar type instructions in a second mode of operation.

19. The portable communication device of claim 18, wherein the memory includes six instruction caches and each instruction cache is associated with one of the six register files.

20. The portable communication device of claim 19, wherein the memory includes six instruction queues, wherein each instruction queue is associated with a single instruction cache within the memory and wherein each instruction queue is coupled to the sequencer.

21. The portable communication device of claim 20, wherein the digital signal processor utilizes interleaved multithreading to execute instructions from multiple program threads retrieved from the instruction caches within the memory.

22. The portable communication device of claim 21, wherein the digital signal processor interleaves six independent program threads.

23. The portable communication device of claim 16, further comprising:
    an analog baseband processor coupled to the digital signal processor;
    a stereo audio coder/decoder (CODEC) coupled to the analog baseband processor;
    a radio frequency (RF) transceiver coupled to the analog baseband processor;
    an RF switch coupled to the RF transceiver; and
    an RF antenna coupled to the RF switch.

24. An audio file player, comprising:
a digital signal processor;
an audio coder/decoder (CODEC) coupled to the digital signal processor;
a multimedia card coupled to the digital signal processor;
a universal serial bus (USB) port coupled to the digital signal processor; and
wherein the digital signal processor includes:
    a memory;
    a sequencer responsive to the memory to fetch a program instruction having a number of operands;
    at least one instruction execution unit responsive to the sequencer; and
    a plurality of register files coupled to the at least one instruction execution unit, each of the plurality of register files including no more than four data read ports and wherein the number of operands is greater than four.

25. The processor device of claim 1, wherein the operands are inputs to the instruction execution units.

26. The processor device of claim 25, wherein a maximum number of bits of the operands is equal to a maximum number of bits of the data read ports.

27. The processor device of claim 25, wherein at least one of the read ports is accessed in consecutive clock cycles, such that at least two of the operands are obtained from the same read port, in consecutive clock cycles.

28. The processor device of claim 1, wherein the operands are directly connected to the data read ports.

* * * * *